June 11, 1940.   A. G. H. STRAATMAN   2,204,196
METHOD AND APPARATUS FOR DETERMINING THE NATURE OF BOREHOLE FLUIDS
Filed Nov. 7, 1938   2 Sheets-Sheet 1

Inventor: Alphons Gerard Hubert Straatman
By his Attorney:

June 11, 1940.  A. G. H. STRAATMAN  2,204,196
METHOD AND APPARATUS FOR DETERMINING THE NATURE OF BOREHOLE FLUIDS
Filed Nov. 7, 1938  2 Sheets-Sheet 2

Inventor: Alphons Gerard Hubert Straatman
By his Attorney:

Patented June 11, 1940

2,204,196

UNITED STATES PATENT OFFICE 2,204,196

METHOD AND APPARATUS FOR DETERMINING THE NATURE OF BOREHOLE FLUIDS

Alphons Gerard Hubert Straatman, The Hague, Netherlands, assignor to Shell Development Company, San Francisco, Calif., a corporation of Delaware Application November 7, 1938, Serial No. 239,339
In the Netherlands November 16, 1937

6 Claims. (Cl. 175—183)

This invention pertains to a method and apparatus for electrically determining the nature and composition of the fluids, such as oil, gas and water, filling oil wells.

Various methods have already been proposed for carrying out such surveys. Some of these methods involve, for example, the use of electrodes lowered into a borehole, the electromotive force generated therebetween by an electrolytic fluid, or the resistance of said fluid to an electric current passed between the electrodes serving as an indication of the nature of said fluid. Owing, however, to the relatively small values of the changes occurring in the composition of the fluid within a borehole, and to a lack of sufficient amplification, the data obtained by these methods often lack the necessary sharpness for determining with accuracy, for example, the points of entry of extraneous fluids, such as formation waters, into the borehole.

According to some other methods, devices comprising high frequency oscillating circuits are lowered into boreholes for effecting similar surveys. Owing, however, to the uncertain distribution of the magnetic or electrostatic field within a relatively wide area about such devices, their indications are more affected by the nature of the strata traversed by the borehole than by that of the liquids contained therein.

Still other methods hitherto used for the determination of the nature of well fluids have the drawbacks of requiring a costly preliminary conditioning of said well fluids, or of being ineffective in the case gas-cut oils, of oil-water emulsions, and of well liquids having throughout an approximately equal transparency.

It is therefore the object of this invention to provide a method and a highly sensitive apparatus for accurately determining the points of entry of any extraneous fluids, such as formation waters or gases, into the well, and the amounts in which they are present therein.

It is another object of this invention to provide for this purpose a method and apparatus capable of operation in boreholes substantially filled with dielectric fluids, such as oil, as well as in boreholes substantially filled with electrolytic conductors such as saline formation waters, said apparatus being adapted to effect capacity measurements as well as resistance or potential measurements.

It is another object of this invention to provide a method and apparatus capable of being operated in producing wells, and of determining the gas-oil ratio in such wells.

The process of the present invention consists in lowering into a fluid-filled borehole a casing containing a high-frequency oscillatory circuit comprising one or more electron tubes, such as triode or pentode tubes, and at least two plates or tubular elements carried by the casing, said elements being adapted to serve either as condenser plates or as electrodes in contact with the well fluid. One of said elements is connected to the cathode of the triode tube, while the potential difference between said elements, which depends on the electric properties of the fluid immediately surrounding said elements, is applied to the grid circuit of the triode tube and causes variations in the anode current of said tube.

The desired measurements are effected according to the present invention by means of a suitable indicating device on the surface, capable of detecting or registering variations in the oscillatory circuit frequency, or in the anode current of the triode tube or tubes, caused either by a change in the capacity of the condenser, when the fluid surrounding said condenser plates is a dielectric such a oil, oil-gas or oil-water mixtures, or by a change in resistance or potential between said electrode elements, when the fluid surrounding them is an electrolyte such as saline water.

The present apparatus has a high sensitivity, since the variations thus electrically registered or indicated are often of considerable magnitude, the capacity of a condenser being directly proportional to the dielectric value of the medium between the plates, which is 1 for air, 2 for oil and about 80 for water. Saline water, on the other hand, acts as a conductor, and causes, therefore, a partial short-circuiting of the condenser when it replaces the oil as a dielectric medium.

The capacity of the condenser being further dependent on the gas content of the oil, the present method also makes it possible to determine the ratio between gas and oil, provided the oil-water ratio in the rising gas liquid mixture is constant, which is usually the case in a well producing at a constant rate.

The method of the present invention, and the apparatus used in practicing the same will be understood from the following description taken with reference to the attached drawings, wherein.

Figure 1:
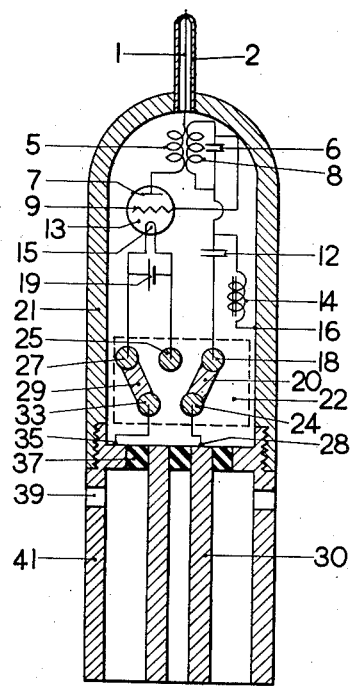
Fig. 1 is a diagrammatic cross-section view of the present device with the electrical circuit connected for measurements in a dielectric fluid.

Referring to Fig. 1, a fluid-tight casing 21 is lowered into a borehole on a conductor cable 1, which is suitably insulated and is provided with a sheath 2, which serves as return conductor. The casing 21 carries attached to its lower portion a tubular element 41, surrounding a second tubular element 30, which is suitably insulated therefrom, and from the casing, by means of a bushing 37. The elements 41 and 30 form a condenser whose capacity is determined by the nature of the dielectric fluid between said elements. The casings 21 contains one or more tubes 13, comprising a plate 7, grid 9 and filament 15, the current for the filament being supplied by means of a battery 19. A tuned circuit comprising condenser 6 and inductance coil 8 is connected to the grid of the tube. The tuned circuit is grounded to the casing through a high frequency choke coil, and is connected to the insulated tubular element by means of a condenser 12, in series with the condenser formed by the elements 41 and 30.

In operation, any change in the nature of the fluid of the borehole, or, in other words, in the dielectric constant between the elements 41 and 30, results in a change in the capacity of the condenser formed by said elements, and affects therefore the oscillatory circuit, causing variations in its frequency or anode current intensity.

Figure 2:
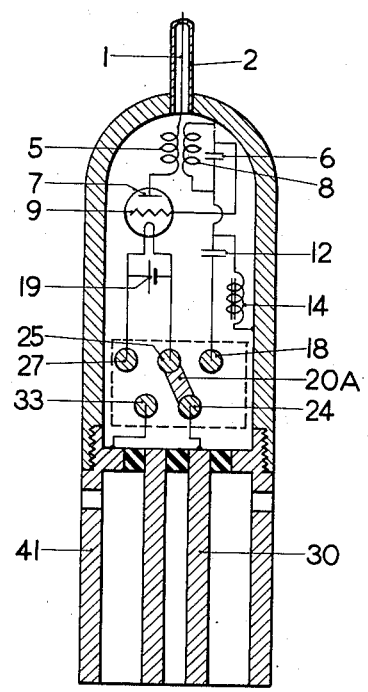
Fig. 2 shows the necessary connection changes for measurements in an electrolytic fluid.

The casing 21 comprises also a switch arrangement diagrammatically shown at 22, and comprising terminals 25, 27, 33, 18 and 24 and links or bus-bars 29 and 20, whereby the connections shown in Fig. 1 and suitable for capacity measurements carried out in a dielectric fluid, may be quickly and conveniently changed to those of Fig. 2, suitable for resistance or potential measurements carried out in an electrolytic fluid. It will be seen from the diagram of Fig. 2 wherein the other terminal of the filament battery is shown connected to the tubular electrode 30, while the electrode 41 is connected to the grid through the coil choke 14, that the grid voltage, and consequently the anode current, is varied when the electrolytic resistance or the potential difference between the electrode 30 and the grounded electrode 41 is varied.

For carrying out measurements according to the diagram of Fig. 2, it may be desirable to increase the liquid resistance by providing the electrode holder with an insulating jacket between the inner electrode and the jacket-shaped outer electrode, as is usual with electrode holders for such purposes.

The insulated inner electrode may furthermore be made of a material having a negative potential with respect to the outer electrode. The effects of decrease of resistance and of increase of potential will in such case be added to each other when the concentration of the electrolytic fluid increases, whereby the sensitivity of the device is further increased. Materials suitable for this purpose may be readily chosen from the electromotive series table by those familiar with electrical arts.

Figure 3:
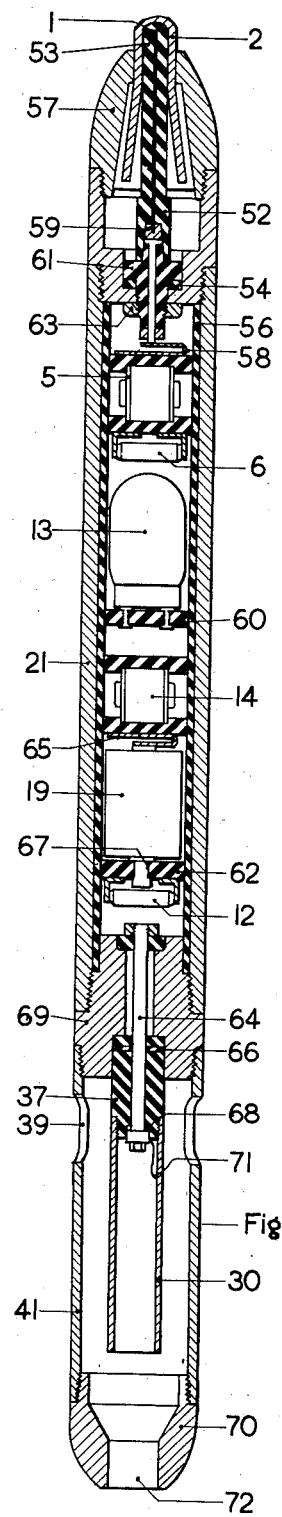
Fig. 3 is a cross-section view of a practical embodiment of the present embodiment of the present device.
Figure 4:
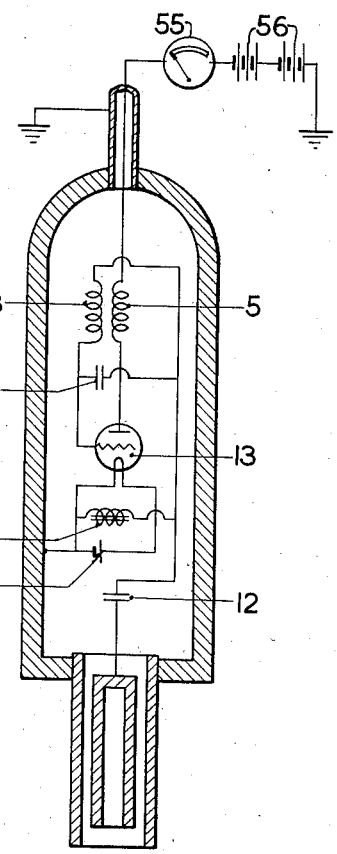
Fig. 4 shows the electrical circuit of Fig. 3.

Referring to Figs. 3 and 4, the casing 21 is supported on a single conductor cable 1, provided with insulation 53 and with a sheath 2, which serves as a return conductor. The conductor 1 of the table is connected above ground to an indicating device 55 and an anode battery 56.

The casing 21 is provided at the top with a cable socket 57. The insulated conductor 1 is soldered into an inlet pin 59, and is insulated by means of a rubber sleeve 52. The pin 59 is mounted in a bushing 61 of insulating material, and is forced by the nut 63 against a rubber ring 54 to secure a liquid-tight joint. The internal parts of the apparatus are mounted in a tube of insulating material 56, the anode coil 5 being fitted at the top. At one end this coil is electrically connected by a small spring 58 to the cable conductor, and at the other end to the anode of the tube 13, supported on a base 60.

The core of the coil 5 is provided with a second winding 8, shown in Fig. 4, which, together with condenser 6, forms an oscillatory circuit.

The positive terminal of the battery 19 provided below the choke coil 14, mounted on a core, is connected to the closing member 69 and, by a small spring 65, also to one of the filament terminals of the tube 13, while its negative terminal is connected by a screw 67 to the other filament terminal of the tube, and further, through the choke coil 14, to the oscillatory circuit.

Below the supporting plate 62 of the battery is mounted the series condenser 12, connected to the inlet pin 64, which passes through the closing member 69 and is insulated therefrom. A liquid tight seal is provided by means of rubber rings 66 and 68. An insulating bushing 37 supports the tubular element 30 of the measuring condenser, which is electrically connected to the inlet pin 64 by means of a blade spring 71. The other measuring condenser plate is formed by the tubular element 40, provided with a bottom piece or shoe 70. A central opening 72 in said shoe serves, together with the windows 39 in the tube 40, for the passage of the well fluid between the two tubular condenser plates, as the apparatus is lowered or raised within the borehole. It will be seen that this arrangement has the advantage of confining the electrostatic field of the measuring condenser to the space between the tubular elements 30 and 41, whereby said condenser is made substantially sensitive only to the dielectric properties of the fluid between said elements, and is not affected either by the electrostatic properties of the fluid in other portion of the well, or by these of the formation strata traversed by the well.

It is understood that a plurality of tubes may be used in the present apparatus instead of the single tube 13, the casing 21 being capable, for example, of containing one or more amplification stages in addition to the circuits shown in the drawings.

I claim as my invention:

1. In a process for determining the nature of a substantially electrolytic fluid within a borehole, the steps of lowering thereinto a casing containing a high frequency oscillatory circuit electrically connected to two electrodes carried by said casing in contact with the well fluid, said electrodes being made of materials capable of generating an electromotive force therebetween when immersed in an electrolyte, at least one of said electrodes being insulated from the casing, causing said circuit to generate high frequency electric oscillations, causing an electromotive force to be generated between said electrodes by contact with the electrolyte, applying said electromotive force to the oscillatory circuit, and determining the nature of the electrolyte well fluid confined between said electrodes from the variations in the electrical characteristics of the oscillatory current due to the changes in the value of the electromotive force generated between said electrodes.

2. In an apparatus for determining the nature of a fluid within a borehole, a casing adapted to be lowered thereinto, an oscillatory circuit within the casing, two plates carried by said casing in contact with the well fluid, at least one of said plates being electrically insulated from said casing, one of said plates being connected to the cathode and the other being reactively coupled with the anode of the oscillatory circuit, means to modify the oscillatory current by applying to the oscillatory circuit the potential difference between said plates, an indicating device on the surface, a conductor electrically connecting said device with the anode of the oscillatory circuit, and means comprising said device for registering the variations in the electrical characteristics of the oscillatory current caused by variations of the potential between the plates due to a change in the electrical properties of the fluid between said plates.

3. In an apparatus for determining the nature of a fluid within a borehole, a casing adapted to be lowered thereinto, an oscillatory circuit within the casing, two plates carried by said casing, means to pass a portion of the well fluid through a space confined between said plates, at least one of said plates being electrically insulated from said casing, one of said plates being connected to the cathode and the other being reactively coupled with the anode of the oscillatory circuit, means to modify the oscillatory current by applying to the oscillatory circuit the potential difference between said plates, an indicating device on the surface, a conductor electrically connecting said device with the anode of the oscillatory circuit, and means comprising said device for registering the variations in the electrical characteristics of the oscillatory current caused by variations of the potential between the plates due to a change in the electrical properties of the fluid between said plates.

4. In an apparatus for determining the nature of an electrolytic fluid within a borehole, a casing adapted to be lowered thereinto, an oscillatory circuit within the casing, two plates carried by said casing, means to pass a portion of the well fluid through the space confined between said plates, said plates being made of materials capable of generating an electromotive force when immersed in an electrolyte, at least one of said plates being electrically insulated from said casing, one of said plates being connected to the cathode and the other being reactively coupled with the anode of the oscillatory circuit, means to modify the oscillatory current by applying to the oscillatory circuit the potential difference between said plates, an indicating device on the surface, a conductor electrically connecting said device with the anode of the oscillatory circuit, and means comprising said device for registering the variations in the electrical characteristics of the oscillatory current caused by variations of the potential between the plates due to a change in the electrical properties of the fluid between said plates.

5. In an apparatus for determining the nature of a fluid within a borehole, a casing adapted to be lowered thereinto, a thermionic oscillator within the casing, an arrangement comprising two concentric plates carried by said casing, means to pass a portion of the well fluid through a space confined between said plates, at least one of said plates being electrically insulated from said casing, one of said plates being connected to the anode and the other to the tuned circuit of the oscillator, a choke coil connected to the tuned circuit of the oscillator, and switching means within the casing adapted for electrically connecting the tuned circuit to one terminal of the anode through said plate arrangement and said choke coil in parallel to measure the dielectric properties of the fluid between said plates, and for electrically connecting the tuned circuit to the other terminal of the anode through said plate arrangement and said choke coil in series to measure the electrolytic properties of the fluid between said plates.

6. In an apparatus for determining the nature of a fluid within a borehole, a casing adapted to be lowered thereinto, an oscillatory circuit within the casing, two plates carried by said casing, means to pass a portion of the well fluid through a space confined between said plates, said plates being made of materials capable of generating an electromotive force when immersed in an electrolyte, at least one of said plates being electrically insulated from said casing, one of said plates being connected to the cathode and the other being reactively coupled with the anode of the oscillatory circuit, means to modify the oscillatory current by applying to the oscillatory circuit the potential difference between said plates, an indicating device on the surface, a conductor electrically connecting said device with the anode of the oscillatory circuit, and means comprising said device for registering the variations in the electrical characteristics of the oscillatory current caused by variations of the potential between the plates due to a change in the electrical properties of the fluid between said plates.

ALPHONS GERARD HUBERT STRAATMAN.